(12) United States Patent
Zentgraf

(10) Patent No.: US 7,599,768 B2
(45) Date of Patent: Oct. 6, 2009

(54) METHOD FOR COMPUTER-ASSISTED DETERMINATION OF AN OPTIMUM-FUEL CONTROL OF NOZZLES

(75) Inventor: Peter Zentgraf, Grosskarolinenfeld (DE)

(73) Assignee: EADS Astrium GmbH, Munich (DE)

( * ) Notice: Subject to any disclaimer, the term of this patent is extended or adjusted under 35 U.S.C. 154(b) by 649 days.

(21) Appl. No.: 10/801,653

(22) Filed: Mar. 17, 2004

(65) Prior Publication Data
US 2005/0027496 A1 Feb. 3, 2005

(30) Foreign Application Priority Data
Mar. 18, 2003 (DE) ................................ 103 11 779

(51) Int. Cl.
G05D 1/00 (2006.01)
G05D 3/00 (2006.01)
G06F 7/00 (2006.01)
G06F 17/00 (2006.01)
B64G 1/24 (2006.01)

(52) U.S. Cl. ........................... 701/13; 244/164; 60/228
(58) Field of Classification Search .................... 701/1, 701/2, 3, 4, 13; 244/164, 169, 172.2; 60/202, 60/203.1, 228, 230; 239/265.25–265.27
See application file for complete search history.

(56) References Cited

U.S. PATENT DOCUMENTS

| 5,452,869 | A | * | 9/1995 | Basuthakur et al. ......... 244/164 |
| 6,208,915 | B1 | | 3/2001 | Schütte et al. ................ 701/13 |
| 6,341,749 | B1 | * | 1/2002 | Ocampo ................... 244/158.5 |
| 6,347,262 | B1 | | 2/2002 | Smay et al. .................... 701/13 |
| 6,496,741 | B1 | * | 12/2002 | Whiffen ....................... 700/28 |
| 6,574,534 | B2 | * | 6/2003 | Yamashita .................... 701/13 |
| 6,631,314 | B2 | * | 10/2003 | Fisher et al. .................. 701/13 |
| 6,845,950 | B1 | * | 1/2005 | Goodzeit et al. ......... 244/158.6 |
| 2002/0077732 | A1 | * | 6/2002 | Yamashita .................... 701/13 |
| 2005/0080521 | A1 | * | 4/2005 | Fischer et al. ................. 701/4 |
| 2005/0119803 | A1 | * | 6/2005 | Zentgraf ....................... 701/13 |

FOREIGN PATENT DOCUMENTS

EP 0977687 5/2001
WO 98/49058 11/1998

* cited by examiner

Primary Examiner—Jack W. Keith
Assistant Examiner—Edward Pipala
(74) Attorney, Agent, or Firm—Greenblum & Bernstein, P.L.C.

(57) ABSTRACT

Method for the computer-assisted determination of an optimum-fuel control of nozzles according to a control instruction $b=Ax$. A defined matrix transformation of starting constraints for the mass flow of the nozzles and of the minimization criterion thereby takes place in a computer-assisted manner, a data processing representation of a geometric description of the matrix-transformed starting constraints, a computer-assisted determination of limiting point sets of the geometric description of the starting constraints through a computer-assisted geometric search procedure in the vector space and the application of the matrix-transformed minimization criterion to the points of the limiting point sets.

9 Claims, 4 Drawing Sheets

METHOD FOR COMPUTER-ASSISTED DETERMINATION OF AN OPTIMUM-FUEL CONTROL OF NOZZLES

CROSS-REFERENCE TO RELATED APPLICATIONS

The present application claims priority under 35 U.S.C. §119 of German Patent Application No. 103 11 779.2, filed on Mar. 18, 2003, the disclosure of which is expressly incorporated by reference herein in its entirety.

BACKGROUND OF THE INVENTION

1. Field of the Invention

The present invention relates to a method for the computer-assisted determination of an optimum-fuel control of nozzles. Such a method can be used in particular for controlling the nozzles of a spacecraft, such as, e.g., a satellite, a space probe, a space station or the like.

2. Discussion of Background Information

A method for the optimum-fuel control of the attitude and nutation of a spinning spacecraft is known from U.S. Pat. No. 6,347,262. An error signal is hereby determined via a determination of spinning rates and spinning angles and a torque applied to the spacecraft according to the result for this error signal.

EP 0 977 687 B1 describes different possibilities for the optimum-fuel computer-assisted control of nozzles of a spacecraft. Mainly methods are described thereby that contain a simplex algorithm, whereby on the other hand it is already stated there that such a simplex algorithm is associated with a high expenditure of computation time. The method described within the scope of that invention uses a method that depends on the simplex algorithm and starts from the formation of a simplex table. A dual simplex algorithm is ultimately used there to form an optimum-fuel control vector. As an alternative possibility for determining an optimum-fuel control of nozzles, only a "table look-up" method is described in EP 0 977 687 B1, in which optimum-fuel nozzle arrangements are calculated and entered in a table, and a current control result is formed from these previously stored results for the respective current control case through the combination of stored results. However, it is disadvantageous that in general an actual optimum-fuel result is not found with this method.

SUMMARY OF THE INVENTION

It is therefore one aspect of the present invention to provide a method for the computer-assisted determination of an optimum-fuel control of nozzles that manages with the lowest possible computation expenditure and nevertheless reliably leads to an optimum-fuel solution.

This aspect is attained through a method for the computer-assisted determination of an optimum-fuel control of nozzles according to a control instruction b=Ax, where b represents a desired m-dimensional forces/torque vector, A represents an m×n-dimensional nozzle matrix, and x represents the sought n-dimensional nozzle control vector and the nozzle control vector should meet the minimization criterion $$J := \sum_{i=1}^{i=n} x_i \rightarrow \min$$

The method further includes a defined matrix transformation of starting constraints for the mass flow of the nozzles and of the minimization criterion that takes place in a computer-assisted manner, a data processing representation of a geometric description of the matrix-transformed starting constraints takes place in a computer-assisted manner, and through a computer-assisted geometric search procedure in the vector space, where a computer-assisted determination of limiting point sets of the geometric description of the starting constraints takes place. Finally, the matrix-transformed minimization criterion is applied to the points of the limiting point sets. The invention further includes a computer program for the computer-assisted determination of an optimum-fuel control of nozzles according to a control instruction b=Ax, where b represents a desired m-dimensional forces/torque vector, A represents an m×n-dimensional nozzle matrix, and x represents the sought n-dimensional nozzle control vector and the nozzle control vector should satisfy the minimization criterion $$J := \sum_{i=1}^{i=n} x_i \rightarrow \min$$

The computer program contains a first program routine for the computer-assisted execution of a defined matrix transformation of starting constraints for the mass flow of the nozzles and the minimization criterion, a second program routine for the computer-assisted execution of a data processing representation of a geometric description of the matrix-transformed starting constraints, a third program routine for the computer-assisted execution of a geometric search procedure in the vector space for the computer-assisted determination of limiting point sets of the geometric description of the starting constraints, and a fourth program routine for the computer-assisted application of the matrix-transformed minimization criterion to the points of the limiting point sets. Finally, the invention includes a computer program product that includes a computer program product containing a machine-readable program carrier on which the above-noted computer program can be stored in the form of electronically readable control signals.

The present invention comprises a method for the computer-assisted determination of an optimum-fuel control of nozzles according to a control instruction b=Ax, whereby b represents a desired m-dimensional forces/torque vector, A represents an m×n-dimensional nozzle matrix and x represents the sought n-dimensional nozzle control vector with the aid of which a corresponding thrust is effected through the associated controlled nozzles. The nozzle control vector should thereby meet the minimization criterion $$J := \sum_{i=1}^{i=n} x_i \rightarrow \min$$

This minimization criterion is the term to indicate that the fuel consumption should be minimal, which is achieved through a minimization of the nozzle control and thus also a minimization of the thrust generated overall through the respective nozzles.

According to the invention, the following process steps are now provided in the scope of this method:

A defined matrix transformation of starting constraints for the mass flow of the nozzles and of the minimization criterion takes place in a computer-assisted manner, whereby the starting constraints and the minimization criterion are respectively subjected to an analogous matrix transformation, A data processing representation of a geometric description of the matrix-transformed starting constraints takes place in a computer-assisted manner, Through a computer-assisted geometric search procedure in the vector space, a computer-assisted determination of limiting point sets of the geometric description of the starting constraints takes place, and The matrix-transformed minimization criterion is applied to the points of the limiting point sets.

A simplex method or a comparable iterative method can thus be avoided within the scope of the invention. Instead of an iterative approach, a geometric approach realized in a computer-assisted manner is selected. Through the defined matrix transformation, a geometric description of the problem is possible that permits a geometric location of an optimum-fuel solution. Such a method can be much quicker than a solution of the problem via customary simplex methods.

In particular it can be provided in the scope of the present invention that:

For the matrix transformation of the starting constraints for the mass flow of the nozzles, a homogenous solution of the control instruction according to $x_{ho} = A_o r$ is defined, whereby $A_o$: represents the n×(n−m) dimensional zero space matrix of A and r: represents an (n−m) dimensional vector of any real numbers Within the scope of the use of the matrix transformation of the minimization criterion a computer-assisted calculation is made of scalar products of a vector representation of points of the limiting point set and the vector $$v_d^T := \left[ \sum_{j=1}^{n} A_{0j1} \sum_{j=1}^{n} A_{0j2} \ldots \sum_{j=1}^{n} A_{0jp} \right], \; p := n - m$$

and

An optimum-fuel solution is calculated with the aid of the vector r whose scalar product is minimal with the vector $v_d$.

This is an example of how through the use of a matrix transformation with the aid of the zero space matrix $A_0$, the minimization criterion as well as the starting constraints can be suitably transformed. The minimization criterion can thereby be essentially reduced to the simple formation of scalar products of vectors, thus to a simple geometric calculation specification.

A preferred further development of the present invention provides that

The matrix-transformed starting constraints for the mass flow of the nozzles is converted in a computer-assisted manner into allowable multi-dimensional value regions, To determine the limiting point sets, a formation of at least one multi-dimensional cut set of the individual allowable multi-dimensional value region takes place, and The limiting point sets are determined as those point sets that limit the at least one cut set.

In this manner the number of the points to be considered in the scope of the method according to the invention can be clearly reduced, since only those points are considered that limit the at least one cut set. This means a further reduction of the computation time required for the method and thus a further advantage over the previously known methods.

Advantageously the above-mentioned method can be still further simplified and thus the necessary computation time can be further reduced in that A repeated projection of the allowable multi-dimensional value regions of the dimension p is made on a dimension p−1, until a projection of the allowable value regions on limiting intervals of a dimension p=1 has been achieved and Subsequently a computer-assisted search procedure carries out a computer-assisted determination of limiting point sets as cut set of limiting intervals.

Through the repeated projection provided here of a dimension p on a dimension p−1, lower and lower dimensions (p−1, p−2, p−3, etc.) are thus gradually reached in which the value regions in question are represented, and thus problems that can be handled more easily in computational terms than they would be in the starting dimension p. In principle when a suitable adequately reduced dimension $p > p_1 > 1$ is reached, the determination of the limiting point sets could already take place. However, the repeated projection is preferably carried out until a description of the dimension p=1 has been reached. Here the problem can be solved in the easiest manner and with the lowest expenditure of computation time.

Another subject of the current invention is a computer program for the computer-assisted determination of an optimum-fuel control of nozzles according to a control instruction $b = A_x$, whereby:

b represents a desired m-dimensional forces/torque vector,

A represents an m×n-dimensional nozzle matrix and x represents the sought n-dimensional nozzle control vector and the nozzle control vector should satisfy the minimization criterion $$J := \sum_{i=1}^{i=n} x_i \rightarrow \min$$

According to the invention it is provided that the computer program contains the following:

A first program routine for the computer-assisted execution of a defined matrix transformation of starting constraints for the mass flow of the nozzles and the minimization criterion, A second program routine for the computer-assisted execution of a data processing representation of a geometric description of the matrix-transformed starting constraints, A third program routine for the computer-assisted execution of a geometric search procedure in the vector space for the computer-assisted determination of limiting point sets of the geometric description of the starting constraints, A fourth program routine for the computer-assisted application of the matrix-transformed minimization criterion to the points of the limiting point sets.

Such a computer program is suitable for executing the above-mentioned method according to the invention. Other program routines can also be provided within the scope of this computer program which are suitable for executing one or more of the above-mentioned further developments of the method according to the invention.

A further subject of the present invention is a computer program product containing a machine-readable program carrier on which an above-described computer program is stored in the form of electronically readable control signals. The control signals can be stored in any suitable form, the electronic readout can then take place accordingly through electrical, magnetic, electromagnetic, electro-optic, or other electronic methods. Examples of such program carriers are magnetic tapes, diskettes, hard disks, CD-ROM or semiconductor components.

One aspect of the present invention includes a method for computer-assisted determination of an optimum-fuel control of nozzles according to a control instruction b=Ax, where: b represents a desired m-dimensional forces/torque vector. A represents an m×n-dimensional nozzle matrix, and x represents a sought n-dimensional nozzle control vector and the nozzle control vector should meet a minimization criterion of $$J := \sum_{i=1}^{i=n} x_i \to \min.$$

The method includes computer generating a defined matrix transformation of starting constraints for a mass flow of the nozzles and of the minimization criterion, data processing a representation of a geometric description of the matrix transformation of starting constraints, searching, with a computer-assisted geometric search procedure in vector space, limiting point sets of the geometric description of the starting constraints, and applying the matrix transformation of minimization criterion to the points of the limiting point sets. Moreover, the matrix transformation of the starting constraints for the mass flow of the nozzles can include a homogenous solution of the control instruction according to $x_{ho}=A_o r$ where $A_o$: represents the n×(n−m) dimensional zero space matrix of A, and r: represents an (n−m) dimensional vector of real numbers. Additionally, the method can include calculating, within a scope of a use of the matrix transformation of the minimization criterion, scalar products of a vector representation of points of the limiting point set and the vector and $$v_d^T := \left[ \sum_{j=1}^{n} A_{0j1} \sum_{j=1}^{n} A_{0j2} \ldots \sum_{j=1}^{n} A_{0jp} \right], p := n - m$$

and calculating an optimum-fuel solution with the aid of the vector r whose scalar product is minimal with the vector $v_d$. Furthermore, the method can include converting the matrix transformation of the starting constraints for the mass flow of the nozzles in a computer-assisted manner into allowable multi-dimensional value regions, forming, to determine the limiting point sets, at least one multi-dimensional cut set of individual allowable multi-dimensional value regions, and determining the limiting point sets as those point sets that limit the at least one cut set. The method can also include repeatedly projecting the allowable multi-dimensional value regions of the dimension p on a dimension p−1, until a projection of the allowable value regions on limiting intervals of a dimension p=1 has been achieved, and subsequently searching, with a computer-assisted search procedure, a determination of limiting point sets as a cut set of limiting intervals. Yet another aspect of the invention includes a computer program for the computer-assisted determination of an optimum-fuel control of nozzles according to a control instruction b=Ax, whereby b represents a desired m-dimensional forces/torque vector, A represents an m×n-dimensional nozzle matrix, and x represents a sought n-dimensional nozzle control vector and the nozzle control vector should satisfy the minimization criterion of $$J := \sum_{i=1}^{i=n} x_i \to \min.$$

The computer program further includes a first program routine for defining a matrix transformation of starting constraints for a mass flow of the nozzles and the minimization criterion, a second program routine for data processing a representation of a geometric description of the matrix transformation of the starting constraints, a third program routine for the execution of a geometric search procedure in the vector space for the determination of limiting point sets of the geometric description of the starting constraints, and a fourth program routine for the application of the matrix transformation minimization criterion to the points of the limiting point sets. Moreover, a computer program product containing a machine-readable program on which a computer program, as noted above, can be stored in the form of electronically readable control signals. Another aspect of the invention includes a computer control method to obtain optimum-fuel usage for nozzles based on an m-dimensional forces/torque vector, m×n-dimensional nozzle matrix, and an n-dimensional nozzle control vector that meets a minimization criterion. The method includes generating a defined matrix transformation of starting constraints for a mass flow of the nozzles and of the minimization criterion, data processing a representation of a geometric description of the matrix transformation of starting constraints, searching, with a geometric search procedure in vector space, limiting point sets of the geometric description of the starting constraints, and applying the matrix transformation of minimization criterion to the points of the limiting point sets. Moreover, the control instruction can be b=Ax, where b represents the desired m-dimensional forces/torque vector, A represents the m×n-dimensional nozzle matrix, and x represents the sought n-dimensional nozzle control vector and the nozzle control vector should satisfy the minimization criterion of $$J := \sum_{i=1}^{i=n} x_i \to \min.$$

Additionally, the matrix transformation of the starting constraints for the mass flow of the nozzles can include a homogenous solution of the control instruction according to $x_{ho}=A_o r$, where $A_o$: represents the n×(n−m) dimensional zero space matrix of A, and r: represents an (n−m) dimensional vector of real numbers. The method can further include calculating, within a scope of a use of the matrix transformation of the minimization criterion, scalar products of a vector representation of points of the limiting point set and the vector $$v_d^T := \left[ \sum_{j=1}^n A_{0j1} \sum_{j=1}^n A_{0j2} \ldots \sum_{j=1}^n A_{0jp} \right], p := n - m$$

and calculating an optimum-fuel solution with the aid of the vector r whose scalar product is minimal with the vector $v_d$. Additionally, the method can include converting the matrix transformation of the starting constraints for the mass flow of the nozzles into allowable multi-dimensional value regions, forming, to determine the limiting point sets, at least one multi-dimensional cut set of individual allowable multi-dimensional value regions, and determining the limiting point sets as those point sets that limit the at least one cut set. Furthermore, the method can include repeatedly projecting the allowable multi-dimensional value regions of the dimension p on a dimension p−1, until a projection of the allowable value regions on limiting intervals of a dimension p=1 has been achieved, and subsequently searching a determination of limiting point sets as a cut set of limiting intervals. Another aspect of the invention includes a computer program for determining an optimum-fuel control of nozzles according to a control instruction based on a desired m-dimensional forces/torque vector, an m×n-dimensional nozzle matrix, and a sought n-dimensional nozzle control vector where the nozzle control vector should satisfy a minimization criterion. The computer program includes a first program routine for defining a matrix transformation of starting constraints for a mass flow of the nozzles and the minimization criterion, a second program routine for data processing a representation of a geometric description of the matrix transformation of the starting constraints, a third program routine for the execution of a geometric search procedure in the vector space for the determination of limiting point sets of the geometric description of the starting constraints, and a fourth program routine for the application of the matrix transformation minimization criterion to the points of the limiting point sets. Moreover, the control instruction can be b=Ax, where b represents the desired m-dimensional forces/torque vector, A represents the m×n-dimensional nozzle matrix, and x represents the sought n-dimensional nozzle control vector and the nozzle control vector should satisfy the minimization criterion of $$J := \sum_{i=1}^{i=n} x_i \to \min.$$

Also, a computer program product containing a machine-readable program on which the computer program noted above can be stored in the form of electronically readable control signals.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
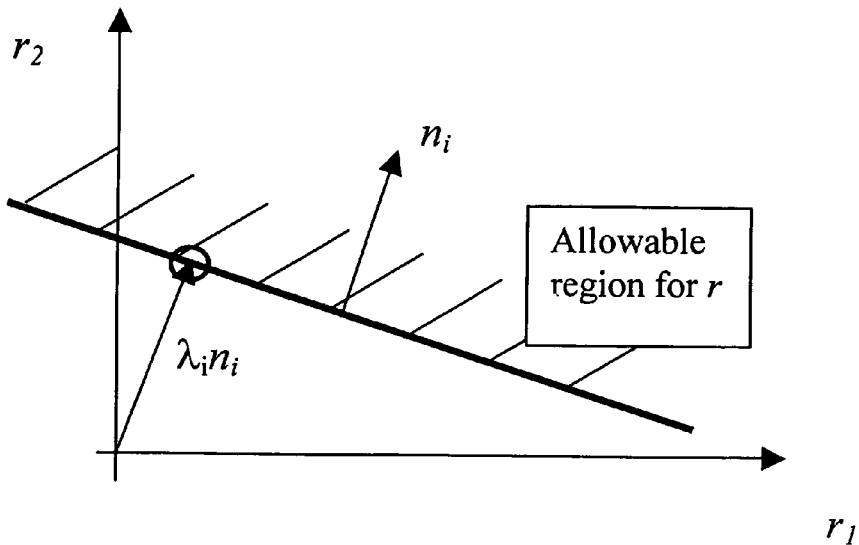
FIG. 1 shows an allowable region for the vectors r in space of the dimension p2, whereby an inequation of constraint $n_i^T(r \times \lambda_i n_i) \geqq 0$ is met.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention relates to the following problem: desired forces and/or torques are to be applied to a spacecraft through nozzles of the spacecraft. How should the nozzles be controlled so that the desired forces and/or torques can be achieved with a minimal amount of fuel for the nozzles? In addition the thrust of the nozzles has to lie in an allowable value region, thus between a minimum possible and a maximum possible value. Accordingly, the control values must therefore also lie in an allowable value region.

This problem is a so-called linear optimization problem. Hitherto simplex algorithms were mostly used to solve such problems, as described at the outset, but they also exhibit the disadvantages described likewise at the outset. The present invention represents an improved possibility for solving the linear optimization problem.

The linear optimization problem for an optimum-fuel nozzle control is based on the equation:

$$b = Ax \qquad (2.1)$$

whereby b represents a desired m-dimensional forces/torque vector,

A represents an m×n-dimensional nozzle matrix and x represents the sought n-dimensional nozzle control vector.

A minimization criterion is to be met for the sought unknown vector x, through which an optimum-fuel control is guaranteed, namely $$J := \sum_{i=1}^{i=n} x_i \to \min \qquad (2.2)$$

Furthermore, the values for the vector x must be in an allowable value region analogous to the allowable value region for the thrust of the nozzles:

$$0 \leq x_i \leq 1 \text{ for } i=1,\ldots n. \qquad (2.3)$$

Without restriction of the generality of the problem shown in (2.1), it can be assumed that the number of the nozzles n is greater than the number m of the desired forces and/or torques.

$$n > m \qquad (2.4)$$

and that the nozzle matrix A has full rank, $$\text{rank}(A) = m \qquad (2.5)$$

An infringement of (2.5) would mean for example if all the nozzles pointed in exactly the same direction. However, this is always avoided by a logical arrangement of the nozzles on the satellite.

Now the minimization criterion can be described:

The general solution of the equation (2.1) $x_g$ can be written as follows:

$$x_g = x_{pa} + x_{ho} \qquad (2.6)$$

whereby
  $x_{pa}$ special solution of (2.1)
  $x_{ho}$ general solution of the homogenous equation of (2.1).
A special solution $x_{pa}$ can be generated from (2.1) as follows:

$$b = Ax = AA^T(AA^T)^{-1}Ax = AA^T(AA^T)^{-1}b = A(A^T(AA^T)^{-1}b)$$
$$= A(x_{pa}) \qquad (2.7)$$

From this the following special solution is obtained:

$$x_{pa} = A^T(AA^T)^{-1}b \qquad (2.8)$$

All the vectors $x_{ho}$ form the general homogenous solution of the problem, for which vectors the following applies:

$$Ax_{ho} = 0, \qquad (2.9)$$

This homogenous solution can be written as follows:

$$x_{ho} = A_0 r \qquad (2.10)$$

whereby
  $A_0$: n×(n−m) zero space matrix of A
  r: (n−m) dimensional vector of any real numbers.
With the aid of the equations (2.6, 2.8, 2.10) the minimization criterion from (2.2) can now be written as $$J(r) = \sum_{j=1}^{n} (x_{pa})_j + v_d^T r \qquad (2.11)$$

with $$v_d^T \left[ \sum_{j=1}^{n} A_{0j1} \sum_{j=1}^{n} A_{0j2} \ldots \sum_{j=1}^{n} A_{0jp} \right] \qquad (2.12)$$

$$p := n - m. \qquad (2.13)$$

Equation (2.11) can now be interpreted as follows: for the permitted values of r the vector should be found whose scalar product becomes minimal with the vector $v_d$. This results from the fact that the special solution as defined in equation (2.8) is no longer accessible to a further minimization. The present invention implements this search for the optimal vector r in a computer-assisted manner with the aid of a corresponding program routine of a computer program.

Geometric description of the optimum-fuel solution:

The allowable values or the allowable region for r is obtained from the starting constraints for the mass flow of the nozzles according to (2.3) through a matrix transformation. This is formally obtained by inserting (2.6, 2.8, 2.10) in 2.3)

$$-x_{pa} \leq A_0 r \leq 1 - x_{pa} \qquad (2.14)$$

whereby
  $\underline{1}$: n-dimensional vector in which all elements equal 1
Now a geometric description of the starting constraints thus transformed can be made which in the scope of the present invention is realized in terms of data processing. The equation (2.14) can thereby be written with the following definitions in scalar form.

$$l_i := x_{pai} \qquad (2.15\text{a-c})$$
$$u_i = 1 - x_{pai}$$
$$A_0 \begin{bmatrix} a_{01}^T \\ a_{02}^T \\ \vdots \\ a_{0n}^T \end{bmatrix}$$

Thus the following is obtained:

$$a_{0i}^T \left( r - \frac{l_i}{a_{0i}^T a_{0i}} a_{0i} \right) \geq 0 \qquad \text{for } i=1,\ldots n \qquad (2.16)$$

$$-a_{0i}^T \left( r - \frac{u_i}{a_{0i}^T a_{0i}} a_{0i} \right) \geq 0 \qquad \text{for } i=1,\ldots n. \qquad (2.17)$$

If now (2.16, 2.17) is divided by $|a_{0i}|$—due to constraint (2.5) this is always possible—and with the following definitions $$n_i := \frac{a_{0i}}{|a_{0i}|} \qquad \text{for } i=1,\ldots n \qquad (2.18)$$

$$n_i := -\frac{a_{0i}}{|a_{0i}|} \qquad \text{for } i=n+1,\ldots 2n \qquad (2.19)$$

$$\lambda_i := \frac{l_i}{|a_{0i}|} \qquad \text{for } i=1,\ldots n \qquad (2.20)$$

$$\lambda_i := \frac{u_i}{|a_{0i}|} \qquad \text{for } i=n+1,\ldots 2n \qquad (2.21)$$

the equations (2.16, 2.17) can be written as follows:

$$n_i^T(r - \lambda_i n_i) \geq 0 \text{ for } i=1,\ldots 2n \qquad (2.22)$$

Figure 2:
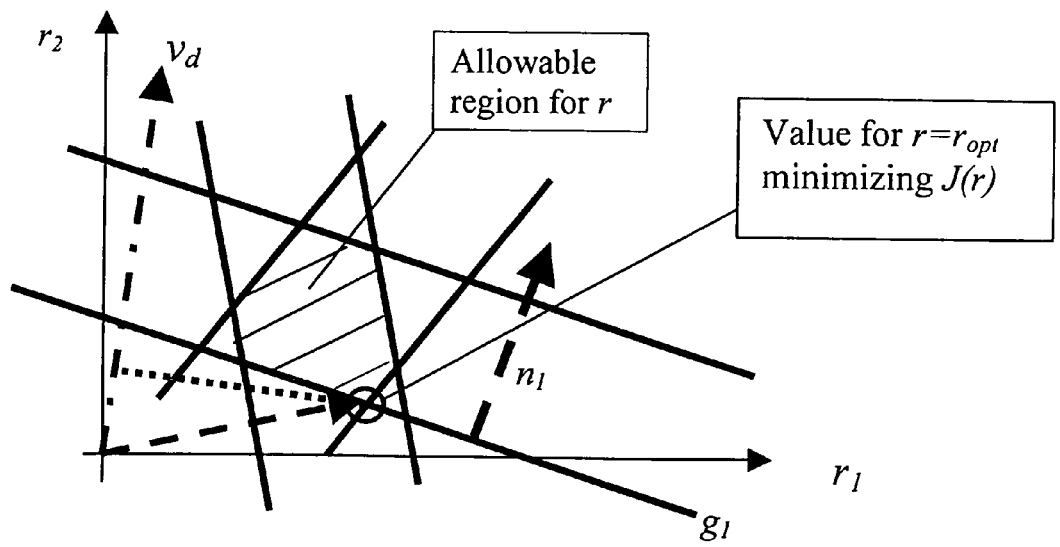
FIG. 2 shows an allowable region for r in two-dimensional space taking into account the starting constraints for several nozzles.

Thus for a certain value of i the equation (2.22) can now be interpreted as a one-dimensional or multi-dimensional plane and thus shown accordingly in terms of data processing (see FIG. 1), whereby this plane is displaced by the vector $\lambda_i n_i$ with respect to the origin and is oriented perpendicular to the normal vector $n_i$. In the case of FIG. 1 this one-dimensional or multi-dimensional plane is represented as a straight line for reasons of simplicity, thus as a plane of the dimension 1. This one-dimensional plane limits the range of the allowable values or the allowable vectors for r. If the sign of $\lambda_i$ is negative, the zero vector is also contained in the allowable region for r; however if the sign of $\lambda_i$ is positive, the zero vector is excluded from the allowable region. The normal vector $n_i$ points in the direction of the allowable region. The geometric description of the equation (2.22) is shown for p=2 in FIG. 1 for $\lambda_i$>0. It is noted that for each constraint i in (2.22) a counter-constraint i+n with $n_{i+n}$=$-n_i$ exists (according to the starting constraints for the minimum and maximum mass flow of an individual nozzle), from which n pairs of constraints result that define allowable "area strips," as shown in FIG. 2.

The common cut set of all allowable regions determines that region in the p-dimensional space in which r meets all 2n transformed starting constraints or all constraints from (2.22). In FIG. 2 this is shown for n=3 nozzles, thus for 6 constraints. If the cut set is formed from all allowable regions, a convex range results as cut set, i.e. that for respectively two points that lie within the cut set, all points also lie on a straight line between these two points within the cut set.

However, not only the region of the allowable values for r can be described geometrically, but also the optimum value for r, $r_{opt}$, which minimizes J in equation (2.11): as stated, J becomes minimal for that vector r that features the smallest scalar product or the smallest projection on the vector $v_d$. In FIG. 2 this is given for the vector r that belongs to the vertex, marked with a circle, that lies on the straight line $g_1$ to which the normal vector $n_1$ belongs. The optimum point thus results as one of the vertices of the limiting lines of the cut set. The limiting lines thus form limiting point sets.

The geometric description of this two-dimensional example can be directly applied analogously to higher dimensions p.

If the problem is a three-dimensional problem, the n-transformed starting constraints can be described as n area regions between n plane pairs, whereby each plane pair comprises two planes parallel to one another and the area region lying between them represents the region for r that meets the relevant transformed starting constraints. The overall allowable region for r that meets all transformed starting constraints results as cut set of all n area regions and thus corresponds to a three-dimensional polygon. The optimum point also results here as one of the vertices of the limitation of the polygon which is now limited by limiting surfaces as limiting point sets. The optimum point is in turn that vertex whose vector r features the smallest scalar product with the vector $v_d$.

Figure 3:
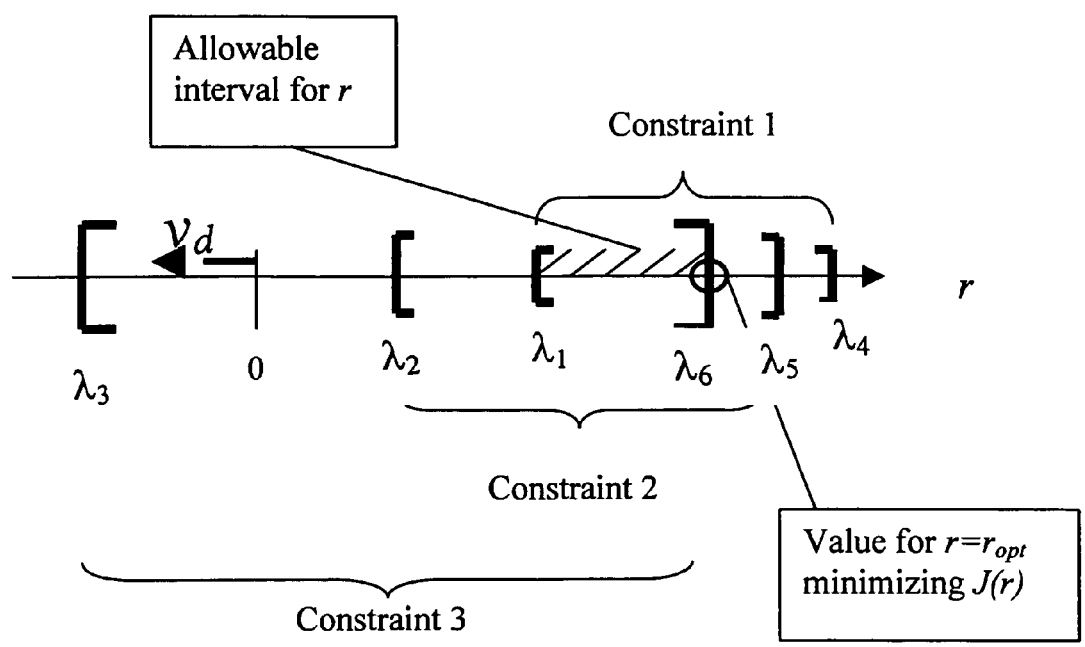
FIG. 3 shows an allowable region for r in the one-dimensional space taking into account the starting constraints for several nozzles.

If it is a one-dimensional problem, the regions that are limited by the n transformed starting constraints can be described as one-dimensional intervals. The n transformed starting constraints are then described through limiting points. This is shown by way of example in FIG. 3. The brackets of the same size shown in FIG. 3 respectively form a pair of transformed starting constraints. The lower limits of the starting constraints are labeled with $\lambda_1, \ldots \lambda_3$, the upper limits of the starting constraints with $\lambda_4, \ldots \lambda_6$ (equations 2.20, 2.21). In the example of FIG. 3 a cut set interval exists as allowable region for r which at the same time meets all transformed starting constraints. The optimum value for r results in turn from a point from the limiting point set, here as the right limiting point of the cut set interval. The vector r belonging to this point in turn has the smallest scalar product with the negative vector $v_d$ also shown in FIG. 3.

The same interpretations and descriptions are applicable to dimensions p>3.

Computer-assisted determination of an optimum-fuel solution:

A special example for determining an optimum-fuel solution will now be shown. A method is thereby executed as described in the scope of the invention, i.e., in particular a computer-assisted determination takes place of (p-1)-dimensional limiting point sets as geometric description of the transformed starting constraints in the form of planes. This special example now describes a preferred further development of the invention and contains in particular the following process steps:

1. Computer-assisted determination of a first of the determined planes as limiting point set that probably contains the optimum-fuel solution. For further detail for finding this plane see below.
2. Computer-assisted application of a linear coordinate transformation to all vectors r so that the normal vector of the first plane is subsequently parallel to the p-th unit vector of those unit vectors that span the vector space of the vectors r and so that the normal vector points in the same direction as this unit vector.
3. Computer-assisted calculation of cut sets in the form of intersecting planes of the other determined planes with the first plane. The p-th component of each intersecting plane thereby has the same constant value as the p-th component of the first plane after the linear coordinate transformation. The clear geometric description of the intersecting planes can thus be simplified to a dimension $p_{new}$=p-1. Thus only the first p-1 components are still needed to describe a vector $v_d$.
4. Computer-assisted test: is $p_{new}$ different from 1? Then steps 1-3 are carried out again.
   Computer-assisted test: if $p_{new}$=1, then a computer-assisted test is carried out on whether an interval is present as cut set that represents an allowable region for r. If no such interval is present, the process is ended, a second plane is selected according to step 1 and the process is carried out again. If such an interval is present, a computer-assisted multiplication is carried out of the limiting points of the interval with the vector $v_d$ now reduced to a vector of the dimension 1, thus to a scalar. The smaller value of the results of the multiplication is stored and, if the process has already been conducted before for one or more other planes, compared with previously stored values. If the value stored last is smaller than a value stored previously, the process is started again according to step 1 with a new plane and correspondingly carried out. If the value stored last is not smaller, then the value stored previously represents the optimal solution.

The individual computer-assisted steps will now be considered in more detail.

Determination of the first of the determined planes according to step 1: In principle the plane that contains the optimum-fuel solution cannot be clearly determined a priori. However, it can be clarified using the example of the case of p=2 that certain fundamental statements are possible on the sought (p-1)-dimensional plane or straight line (in the case p=2 the sought plane thus has the dimension 1). For geometric reasons it is clear that the optimum-fuel solution always lies on one of the straight line sections that limit the cut set of all allowable regions, namely on those straight lines whose normal vector (which points in the direction of the allowable region) has the greatest scalar product with the vector $v_d$ and whose direction thus best corresponds to the direction of the vector $v_d$. In FIG. 2 the normal vector $n_1$ best corresponds to the vector $v_d$, so that the vector $v_d$ features the greatest scalar product with this normal vector. This scalar product can be calculated in a computer-assisted manner and the corresponding normal vector and thus the relevant (p−1)-dimensional plane can be determined in a computer-assisted manner. In this method with respect to FIG. 2 it is therefore assumed that the optimum-fuel solution lies on the straight line section that limits the cut set and is characterized by the normal vector $n_1$. The approach is analogous in all the cases of this method.

Thus in particular the following process steps are carried out:

Determination of the normal vector whose scalar product is maximum with the vector $v_d$.

Determining whether the relevant straight line (or in general: (p−1)-dimensional plane) represents a limiting point set of the cut set (see below). If not, this straight line is abandoned and the straight line is selected whose normal vector features the second largest scalar product with the vector $v_d$. Then this straight line is tested again to see whether it represents a limiting point set.

Figure 4:
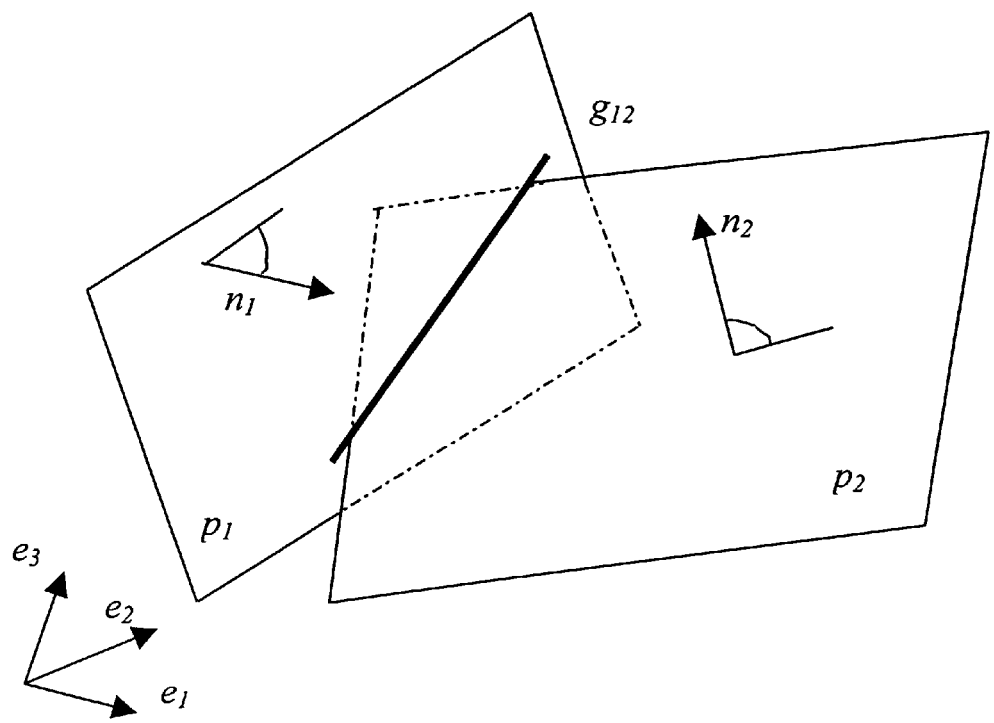
FIG. 4 shows a cut set of two (p−1)-dimensional planes.
Figure 5:
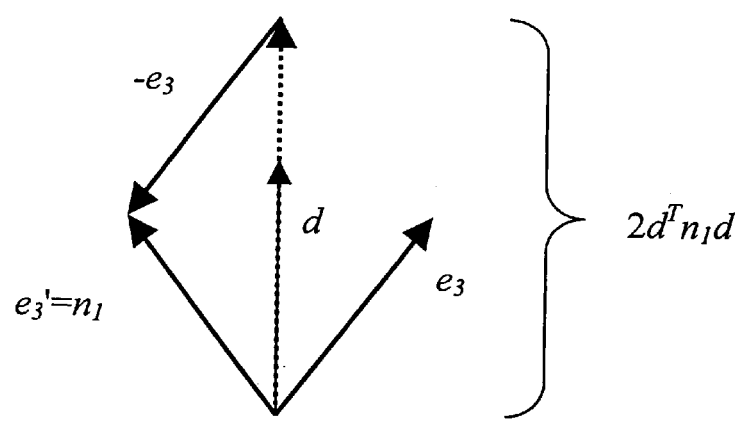
FIG. 5 shows linear coordinates transformation of unit vectors.

Coordinate transformation of the first plane:

In order to simplify the computer-assisted determination of the intersecting planes which results as cut set of the individual (p−1)-dimensional planes, a new coordinate system is introduced. This is shown in FIG. 4. The coordinate system is rotated through a linear coordinate transformation such that a unit vector (here the unit vector with the highest index, i.e., index p is selected) coincides with the normal vector of the plane that was selected as the first plane in the step described above. Through this coordinate transformation an advantage results that the p-th coordinate of all intersecting planes now feature the same constant value. FIG. 4 shows two levels $p_1$ and $p_2$ that in the case of FIG. 4 feature an intersecting plane $g_{12}$ of the dimension 1, thus a straight line as cut set. Let $p_1$ now be the first plane selected according to the method described above. Then through a coordinate transformation the unit vector $e_3$ is rotated by 180° around the vector $e_3+n_1$ in order to obtain a transformed unit vector $e_3'$ that now coincides with the vector $n_1$ (see FIG. 5). The third coordinate of $g_{12}$ then becomes a constant. This coordinate transformation can be expressed as:

$$e'_3 = n_n = \lfloor 2dd^T - E \rfloor e_3 \quad (2.23)$$

with $$d := \frac{e_3 + n_1}{|e_3 + n_1|} \quad (2.24)$$

The transformation equation (2.23) can be generalized from three dimensions to a p-dimensional problem with $$e'_p = n_i = \lfloor 2dd^T - E \rfloor e_p \quad (2.25)$$

with $$d := \frac{e_p + n_i}{|e_p + n_i|} \quad (2.26)$$

whereby i is the index of the selected plane.

Determination of the intersecting planes/cut sets:

Equations for describing the cut sets can be determined in the form of plane equations. The plane equation for each plane i in the p-dimensional space can be described as:

$$[n_{i1} n_{i2} n_{i3} \ldots n_{ip-1} n_{ip}] \begin{bmatrix} r_1 \\ r_2 \\ r_3 \\ r_{p-1} \\ r_p \end{bmatrix} - \lambda_i = 0 \quad (2.27)$$

The cut set of this plane with a selected plane j is described by the equation:

$$r_p = \lambda_j \quad (2.28)$$

Thus this is obtained as a description of the cut set in the form of an intersecting plane:

$$[n_{i1} n_{i2} n_{i3} \ldots n_{ip-1}] \begin{bmatrix} r_1 \\ r_2 \\ r_3 \\ r_{p-1} \end{bmatrix} + n_{ip}\lambda_j - \lambda_i = 0. \quad (2.29)$$

Equation (2.29) can be transcribed in the form of the equation (2.27) to give $$\bar{n}_i^T \bar{r} - \bar{\lambda}_i = 0. \quad (2.30)$$

with $$\bar{n}_i := \begin{bmatrix} n_{i1} \\ n_{i2} \\ n_{i3} \\ n_{ip-1} \end{bmatrix} * \frac{1}{\sqrt{1 - n_{ip}^2}} \quad (2.31)$$

$$\bar{r} := \begin{bmatrix} r_1 \\ r_2 \\ r_3 \\ r_{p-1} \end{bmatrix} \quad (2.32)$$

$$\bar{\lambda}_i := \frac{\lambda_i - n_{ip}\lambda_j}{\sqrt{1 - n_{ip}^2}} \quad (2.33)$$

Computer-assisted search procedure:

The computer-assisted search procedure can now in principle contain the following steps:

1. Computer-assisted determination of the most promising first plane as start plane which most likely contains the optimum-fuel solution and storage of the vector that points from the point of origin to this plane.
2. Computer-assisted execution of a coordinate transformation as described above and computer-assisted determination of intersecting planes as also described above.
3. With the determined intersecting planes the process steps described above are then executed until the dimension is reduced to p=1.
4. It is then determined whether an allowable interval is present (see above). If this is given, according to the above description a point is determined as description of an optimum-fuel solution and through a corresponding back-transformation of the coordinates the optimum-fuel solution is calculated in a computer-assisted manner.
5. Repetition of steps 1 through 4 until no further improvement is obtained. The solution then present represents the global optimum-fuel solution.

Figure 6:
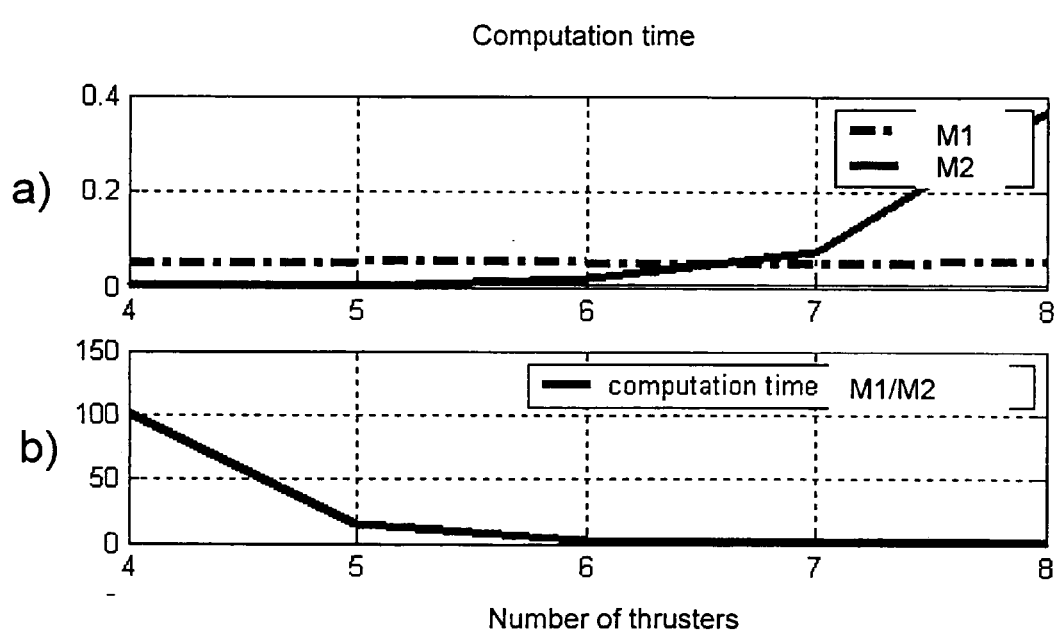
FIG. 6 shows a comparison between computation time of a conventional method according to a simplex algorithm and the method according to the invention.

FIG. 6 shows within the framework of a calculation example a comparison between the computation time of a conventional method M1 according to a simplex algorithm and the method M2 according to the invention, respectively for arrangements with 4, 5, 6, 7 or 8 nozzles. As is already clear from FIG. 6a), in this example the computation time for the method M2 according to the invention for the cases with 4, 5 and 6 nozzles is clearly shorter than the computation time of the simplex method M1. FIG. 6b) illustrates the computation time M1/computation time M2 ratio. The computation time of M1 is slower than the method according to the invention by a factor of 100 for 4 nozzles, by a factor of 16 for 5 nozzles and by a factor of 3 for 6 nozzles. Only for higher numbers of nozzles is the method M2 according to the invention slower than the simplex method in this example.

If the optimal solution in the one-dimensional space is to be determined (i.e., if the difference between the number of nozzles and the number of the constraints equals 1), the above description of the method can be brought into a more compact form. Then equation (2.14) results as n equations for the upper limit and lower limit, thus as the allowable region of the transformed starting constraints $$-x_{pa} \leq a_0 r \leq 1 - x_{pa} \quad (2.23)$$

with the n-dimensional zero space vector $a_0$ and the unknown scalar r.

If a component $a_{0i}$ is equal to zero, $0 <= x_{pai} <= 1$ must apply for the special solution, otherwise the above-mentioned constraint cannot be met. However, this case is excluded here, since this case in practice would mean a badly selected nozzle arrangement.

The equations (2.23) are divided by the components $a_{0i}$ (taking into account the sign of $a_{0i}$), and the result is $$r_{min} \leq r \leq r_{max} \quad (2.24)$$

with $$r_{mini} := \begin{cases} -\dfrac{x_{pai}}{a_{0i}} & \text{for } a_{0i} > 0 \\ \dfrac{1 - x_{pai}}{a_{0i}} & \text{for } a_{0i} < 0 \end{cases} \quad (2.25)$$

$$r_{maxi} := \begin{cases} \dfrac{1 - x_{pai}}{a_{0i}} & \text{for } a_{0i} > 0 \\ -\dfrac{x_{pai}}{a_{0i}} & \text{for } a_{0i} < 0 \end{cases} \quad (2.26)$$

The constraints in (2.24) can only be met at the same time if $$\max(r_{min}) \leq \min(r_{max}) \quad (2.27)$$

The optimum solution for r, $r_{opt}$, depends on the sign of the scalar $v_d$ in the minimization criterion (2.11): for $v_d$ greater than zero, the minimization criterion is as small as possible if r is selected on the left edge of the interval (2.27), $$r_{opt} = \max(r_{min}) \text{ for } v_d > 0 \quad (2.28)$$

and on the other hand for $v_d$ smaller than zero, the minimization criterion is as small as possible if r is selected on the right edge of the interval (2.27)

$$r_{opt} = \min(r_{max}) \text{ for } v_d < 0 \quad (2.29)$$

For $v_d = 0$ any value for r can be selected from the interval (2.27) in order to meet the minimization criterion.

The values for $a_0$ and $v_d$ depend only on the position and thrust direction of the nozzles, but not on the current thrust demands. The case discrimination according to (2.25, 2.26, 2.28, 2.29) therefore needs to occur only once before the computer-assisted execution of the method to determine the optimal solution.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for controlling nozzles based upon computer-assisted determination of an optimum-fuel control of the nozzles according to a control instruction b=Ax, whereby b represents a desired m-dimensional forces/torque vector, A represents an m×n-dimensional nozzle matrix, and x represents a sought n-dimensional nozzle control vector and the nozzle control vector meets a minimization criterion of $$J := \sum_{i=1}^{i=n} x_i \to \min,$$

the method comprising:

computer generating a defined matrix transformation of starting constraints for a mass flow of the nozzles and of the minimization criterion;

data processing a representation of a geometric description of the matrix transformation of starting constraints;

searching, with a computer-assisted geometric search procedure in vector space, limiting point sets of the geometric description of the starting constraints;

applying the matrix transformation of minimization criterion to the points of the limiting point sets; and controlling the nozzles.

2. The method according to claim 1, wherein the matrix transformation of the starting constraints for the mass flow of the nozzles includes a homogenous solution of the control instruction according to $x_{ho} = A_o r$, whereby $A_o$: represents the n×(n−m) dimensional zero space matrix of A, and r: represents an (n−m) dimensional vector of any real numbers, the method further comprising:

calculating, within a scope of a use of the matrix transformation of the minimization criterion, scalar products of a vector representation of points of the limiting point set and the vector $$v_d^T := \left[ \sum_{j=1}^{n} A_{0j1} \sum_{j=1}^{n} A_{0j2} \ldots \sum_{j=1}^{n} A_{0jp} \right], \quad p := n - m$$

and
- calculating an optimum-fuel solution with the aid of the vector r whose scalar product is minimal with the vector $v_d$.

3. The method according to claim 1, further comprising:
- converting the matrix transformation of the starting constraints for the mass flow of the nozzles in a computer-assisted manner into allowable multi-dimensional value regions;
- forming, to determine the limiting point sets, at least one multi-dimensional cut set of individual allowable multi-dimensional value regions; and
- determining the limiting point sets as those point sets that limit the at least one cut set.

4. The method according to claim 3, further comprising:
- repeatedly projecting the allowable multi-dimensional value regions of the dimension p on a dimension p−1, until a projection of the allowable value regions on limiting intervals of a dimension p=1 has been achieved; and
- subsequently searching, with a computer-assisted search procedure, determination of limiting point sets as a cut set of limiting intervals.

5. A computer control method for controlling nozzles based upon an optimum-fuel usage for the nozzles based on a m-dimensional forces/torque vector, m×n-dimensional nozzle matrix, and a n-dimensional nozzle control vector that meets a minimization criterion, the method comprising:
- generating a defined matrix transformation of starting constraints for a mass flow of the nozzles and of the minimization criterion;
- data processing a representation of a geometric description of the matrix transformation of starting constraints;
- searching, with a geometric search procedure in vector space, limiting point sets of the geometric description of the starting constraints;
- applying the matrix transformation of minimization criterion to the points of the limiting point sets; and
- controlling the nozzles.

6. The method according to claim 5, wherein the control instruction is b=Ax, whereby
- b represents the desired m-dimensional forces/torque vector,
- A represents the m×n-dimensional nozzle matrix, and
- x represents the sought n-dimensional nozzle control vector and the nozzle control vector satisfies the minimization criterion of $$J := \sum_{i=1}^{i=n} x_i \to \min.$$

7. The method according to claim 6, wherein the matrix transformation of the starting constraints for the mass flow of the nozzles includes a homogenous solution of the control instruction according to $x_{ho} = A_o r$, whereby
- $A_o$: represents the n×(n−m) dimensional zero space matrix of A, and
- r: represents an (n−m) dimensional vector of real numbers, the method further comprising:
    - calculating, within a scope of a use of the matrix transformation of the minimization criterion, scalar products of a vector representation of points of the limiting point set and the vector $$v_d^T := \left[ \sum_{j=1}^{n} A_{0j1} \sum_{j=1}^{n} A_{0j2} \ldots \sum_{j=1}^{n} A_{0jp} \right], \quad p := n - m$$

and
- calculating an optimum-fuel solution with the aid of the vector r whose scalar product is minimal with the vector $v_d$.

8. The method according to claim 6, further comprising:
- converting the matrix transformation of the starting constraints for the mass flow of the nozzles into allowable multi-dimensional value regions;
- forming, to determine the limiting point sets, at least one multi-dimensional cut set of individual allowable multi-dimensional value regions; and
- determining the limiting point sets as those point sets that limit the at least one cut set.

9. The method according to claim 8, further comprising:
- repeatedly projecting the allowable multi-dimensional value regions of the dimension p on a dimension p−1, until a projection of the allowable value regions on limiting intervals of a dimension p=1 has been achieved; and
- subsequently searching a determination of limiting point sets as a cut set of limiting intervals.

\* \* \* \* \*